Jan. 31, 1928.
F. P. PETERSEN
1,658,007
FRUIT SPLITTER
Filed Oct. 30, 1926
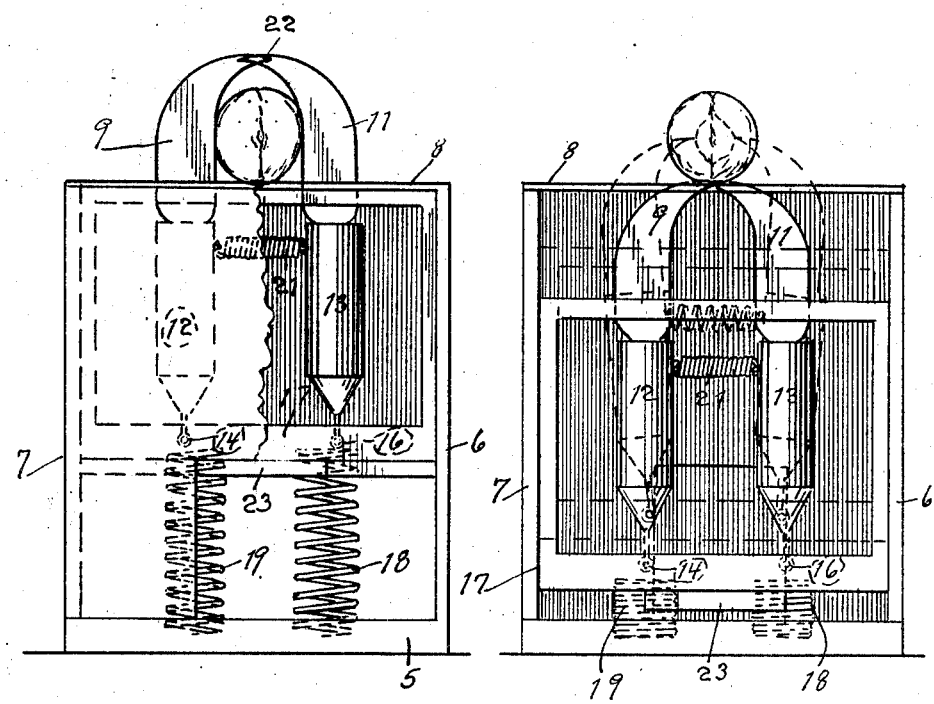
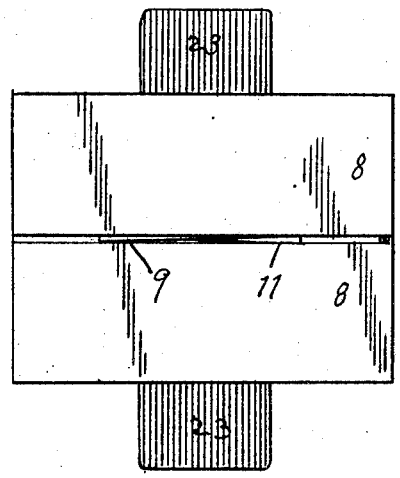
INVENTOR.
F. P. PETERSEN
BY
*Victor J. Evans*
ATTORNEY Patented Jan. 31, 1928.

1,658,007

UNITED STATES PATENT OFFICE.

FREDERIK P. PETERSEN, OF SAN FRANCISCO, CALIFORNIA.

FRUIT SPLITTER.

Application filed October 30, 1926. Serial No. 145,276.

This invention relates to improvements in fruit splitters and has particular reference to a peach and apricot splitter.

The principal object of this invention is to provide means whereby fruit such as peaches and apricots may be split for the purpose of removing the pit of the fruit.

Another object of the invention is to provide a device which is simple to operate, and one which can therefore be operated by an unskilled operator.

A further object is to provide a device of this character which is economical to manufacture and one which will therefore be within the price of the average user.

A still further object is to provide a splitter which will not mutilate the fruit in the operation of cutting the same, as is common with many forms of cutters now upon the market.

Other objects and advantages will be apparent during the course of the following description.

In the accompanying drawings forming a part of this specification, and in which like numerals are employed to designate like parts throughout the same, Figure I is a side elevation of my improved device, partly broken away to show the interior thereof, Figure II is a view similar to Figure I, with the knives in depressed position and having the front plate entirely removed, and Figure III is a top plan view of Figure I.

In the handling of fruit, such as peaches and apricots, it is common to employ a large number of laborers whose task is to cut with a sharp knife around the fruit and to then remove the pit therefrom, after which the fruit is allowed to dry on trays and placed in the sun or in kilns to dry. The handling of the fruit in this manner results in the same being cut unevenly and many times badly crushed.

To overcome these disadvantages, I have produced my present device whereby the fruit will be cut in a manner that will obviate these difficulties.

In the accompanying drawings wherein for the purpose of illustration is shown a preferred embodiment of my invention, the numeral 5 designates the base of the device having sides 6 and 7 which are connected by a top 8.

The top 8 is preferably made in two halves, so as to accommodate knives 9 and 11 therebetween. These knives 9 and 11 are carried by handles 12 and 13, respectively, which handles are pivotally supported as at 14 and 16, respectively, in a rectangular frame 17. This frame is adapted to be reciprocated in the housing formed by the base, sides and top, above referred to.

The sliding frame 17 is normally held in the position shown in Figure I as by springs 18 and 19, while a spring 21 normally holds the knives in such a manner that their tips overlap as shown at 22 (see Figure I).

An operating board is shown at 23, which operating board is employed for the purpose of moving the frame 17 to the position shown in Figure II.

The manner of operating my device is as follows:—

Assuming that the same has been assembled as shown in Figure I, the fruit to be cut is placed upon the top 8 at a point between the knives 9 and 11. By next pushing downwardly upon the operating board 23, the result will be that the knives will move into contact with the fruit and cut through the meat of the fruit until the points engage the pit, after which the points will follow the contour of the pit until they reach the full line position shown in Figure II. In Figure II, the cutting action is shown in dotted lines.

It will thus be seen that I have produced a device wherein the mere pushing down of an operating board causes a pair of knives to simultaneously cut through and around a peach or apricot pit so as to neatly divide the meat of the fruit from the pit.

It is to be understood that the form of my invention herewith shown and described is to be taken as a preferred example of the same, and that various changes relative to the material, shape, size and arrangement of parts may be resorted to without departing from the spirit of the invention, or the scope of the subjoined claims.

Having thus described my invention, I claim:—

1. In a fruit splitter, a frame adapted to be reciprocated, a pair of knives supported in said frame, said knives having curved ends which approach each other and normally lie in overlapping relation, means for reciprocating said knives for the purpose of drawing said knives over fruit placed therebetween so as to sever said fruit throughout the entire circumference thereof.

2. In a fruit splitter, a base, sides secured to said base, a top, a frame adapted to be reciprocated between said sides, a pair of knives having curved normally overlapping extremities supported in said frame, means for normally maintaining said knives in a position projecting through said top, and means for moving said knives to a position beneath said top.

3. In a fruit splitter, a base, sides secured to said base, a top, a frame adapted to be reciprocated between said sides, a pair of knives having curved extremities supported in said frame, means for normally maintaining said knives in a position projecting through said top, means for moving said knives to a position beneath said top and resilient means for maintaining said knives in contact with the pit of fruit placed therebetween.

In testimony whereof I affix my signature.

FREDERIK P. PETERSEN.